United States Patent
Tardy-Tuch et al.

(10) Patent No.: US 11,628,874 B2
(45) Date of Patent: Apr. 18, 2023

(54) METHOD AND APPARATUS FOR "HANDS-ON" IDENTIFICATION ON STEERING SYSTEMS

(71) Applicant: Dr. Ing. h.c. F. Porsche Aktiengesellschaft, Stuttgart (DE)

(72) Inventors: Georg Tardy-Tuch, Unterreichenbach-Kapfenhardt (DE); Dario Düsterloh, Vaihingen an der Enz (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 490 days.

(21) Appl. No.: 16/861,515

(22) Filed: Apr. 29, 2020

(65) Prior Publication Data
US 2020/0353970 A1  Nov. 12, 2020

(30) Foreign Application Priority Data
May 8, 2019  (DE) ...................... 10 2019 111 990.1

(51) Int. Cl.
*B62D 1/04* (2006.01)
*B62D 6/08* (2006.01)
*G01L 5/22* (2006.01)

(52) U.S. Cl.
CPC ............... *B62D 1/04* (2013.01); *B62D 6/08* (2013.01); *G01L 5/221* (2013.01)

(58) Field of Classification Search
CPC ... B62D 1/04; B62D 6/08; B62D 6/00; B62D 15/025; G01L 5/221; G01L 3/00; B60W 10/20; B60W 50/16
See application file for complete search history.

(56) References Cited

U.S. PATENT DOCUMENTS 6,859,143 B2   2/2005  Braeuchle et al.
9,096,262 B2   8/2015  Urhahne
(Continued)

FOREIGN PATENT DOCUMENTS

DE         10155083 A1      9/2002
DE      102013209459 A1     11/2013
(Continued)

OTHER PUBLICATIONS

Korean Notice of Preliminary Rejection for Korean Application No. 10-2020-0053145, dated Jul. 6, 2021, 4 pages.

*Primary Examiner* — Ig T An
(74) *Attorney, Agent, or Firm* — RatnerPrestia

(57) ABSTRACT

A method for "hands-on" identification on a steering system having two subsystems connected to one another by an elastic connection. The elastic connection has a static friction state and a sliding friction state for a respective set of external state variables. The steering system is excited by an excitation vibration, which is generated by a controllable vibration generator and has a respective excitation amplitude and a respective excitation frequency, for a respective set of external state variables, in which the respective excitation amplitude and the respective excitation frequency for the currently present set of external state variables are taken from a prescribed table and the vibration generator is controlled with them. A reaction torque to the excitation vibration is measured using a sensor. A phase difference between the excitation vibration and the reaction torque is calculated to identify a "hands-off" state as well as a "hands-on" state.

10 Claims, 3 Drawing Sheets

(56) References Cited

U.S. PATENT DOCUMENTS

| | | | | |
|---|---|---|---|---|
| 10,139,298 B2* | 11/2018 | Kim | ...................... | B60W 50/14 |
| 10,457,323 B2 | 10/2019 | Rohrmoser | | |
| 10,773,750 B2* | 9/2020 | Rafaila | ................ | B60W 40/08 |
| 11,173,836 B2* | 11/2021 | Oesterwind | .......... | G07C 5/0816 |
| 2019/0126981 A1 | 5/2019 | Goering et al. | | |
| 2020/0189655 A1* | 6/2020 | Ahn | ....................... | B62D 1/046 |

FOREIGN PATENT DOCUMENTS

| | | |
|---|---|---|
| DE | 102013008943 A1 | 11/2014 |
| DE | 102015007740 A1 | 12/2016 |
| DE | 102016005013 A1 | 10/2017 |
| DE | 102017211545 A1 | 6/2018 |
| DE | 102017219467 A1 | 5/2019 |
| KR | 1020150098987 A | 8/2015 |
| KR | 1020180050921 A | 5/2018 |

\* cited by examiner

METHOD AND APPARATUS FOR "HANDS-ON" IDENTIFICATION ON STEERING SYSTEMS

CROSS-REFERENCE TO RELATED APPLICATION

This application claims priority to German Patent Application No. 10 2019 111 990.1, filed May 8, 2019, the content of such application being incorporated by reference herein in its entirety.

FIELD OF THE INVENTION

The present invention relates to a method for "hands-on" identification on steering systems. The invention further claims an apparatus for "hands-on" identification.

BACKGROUND OF THE INVENTION

It is a legal requirement for some driver assistance functions which relate to steering of a vehicle for contact with the steering wheel by a driver to be monitored. Contact with the steering wheel or interruption thereof, also called "hands-on" and, respectively, "hands-off", can be established, for example, by means of a direct sensor system on the steering wheel or the steering system, wherein, however, the sensor system creates additional costs. Indirect measurement, for example, by means of abovementioned characteristic variables—here of the steering system—therefore appears to be advantageous. One problem with this is that detection of one of the two states "hands-on" and "hands-off" is generally strongly overridden by a system friction. Methods which are known for this purpose observe a movement behavior of a subsystem and detect, possibly using a corresponding filter, a respective friction state. An amplitude value of a selected characteristic variable relating to the movement behavior is substantially used as a quantitative variable for monitoring purposes.

For example, document DE 101 55 083 A 1, which is incorporated by reference herein, describes an interference variable observer which detects a response vibration of an applied interference variable. One of the two states "hands-on" and "hands-off" is closed depending on the difference between the response vibration and the excitation vibration.

Document DE 10 2017 211 545 A1, which is incorporated by reference herein, proposes applying a reference vibration to the steering wheel and observing a torque signal using a torque sensor. A filter is also required in order to extract the torque signal from a vibration frequency band. A conclusion is drawn about contact with ("hands-on") the steering wheel by a driver depending on the attenuation of the torque signal.

Subsystems which are elastically coupled to one another, such as those of a steering system for example, form an overall system of which the characteristic variables experience a change depending on an external influence, said change being caused by the respective external influence. Changes of this kind are used in the prior art, for example, to monitor a driving behavior of a car.

Document DE 10 2013 008 943 A1, which is incorporated by reference herein, establishes whether a vehicle is on a smooth road by means of monitoring an operating variable on the steering system. The operating variable may be, amongst others, an engine angle or a torque which is transmitted to a torsion bar of the steering system.

SUMMARY OF THE INVENTION

Precise knowledge of the respective friction states, such as static friction state or sliding friction state—for example depending on aging and/or temperature —, in the steering system is necessary in order to be able to reliably distinguish these friction states from one another. At the same time, it would in turn be necessary for "hands-on" identification, on the basis of distinguishing between friction states in this way, to ensure, with vibration-based detection methods, that a transition, which is respectively to be detected, between the various friction states can actually take place.

Against this background, it would be desirable to provide a method for "hands-on" identification on a steering system, which method is based on reliably ascertaining friction coefficients and, on the basis of these, on identifying one of the various friction states. Additional sensor systems should be avoided in so doing. Furthermore, an apparatus for said "hands-on" identification should be presented.

Described herein is a method for "hands-on" identification on a steering system, in which the steering system has at least two subsystems which are connected to one another by at least one elastic connection. The at least one elastic connection is described by at least one respective static friction state and one respective sliding friction state for a respective set of external state variables. The steering system is excited by an excitation vibration, which is generated by means of a controllable vibration generator and has a respective excitation amplitude and a respective excitation frequency, for a respective set of external state variables. The respective excitation amplitude and the respective excitation frequency are taken from a prescribed table for a currently present set of external state variables and the vibration generator is controlled with them. A reaction torque to the excitation vibration is measured using a sensor, wherein a phase difference between the excitation vibration and the reaction torque is calculated. Finally, identification of a "hands-off" state is established by a value of the phase difference of between 0° and 90°, and identification of a "hands-on" state is established by a value of the phase difference of between 90° and 180°.

The "hands-on" state, that is to say contact with or holding of a steering wheel, for example, by a driver of a vehicle, which can be a car, leads to a mass difference in the steering system which is held by a driver. Owing to an additional mass of this kind, an inertia of the steering system, which steering system can vibrate owing to the elastic connection, increases and a natural system frequency drops in comparison to the non-held "hands-off" state, that is to say in which the driver is not holding the steering wheel. If the steering system is excited by an excitation vibration with an excitation frequency below the natural system frequency of the non-held steering system, subcritical excitation is present and a phase of the reaction torque, which phase is measured by the sensor, is between 0° and 90° in relation to the phase of the excitation vibration. A relationship between these two phases is also called the phase position. In contrast, supercritical excitation is present and the phase of the reaction torque, which phase is measured by the sensor, is between 90° and 180° in relation to the phase of the excitation vibration in the held "hands-on" state, wherein the excitation frequency is selected in such a way that it lies above a natural system frequency, which is reduced owing to the increased inertia, of the now held steering system.

Observation of the phase difference between the reaction torque and the excitation vibration with an excitation frequency below the natural system frequency of the non-held steering system will undergo the abovementioned change in value only when the natural system frequency of the held steering system falls below the excitation frequency owing to contact with a steering wheel. However, in this case, it is necessary to ensure that the subsystems which are joined by the at least one elastic connection can actually execute a (under certain circumstances damped) vibration, that is to say the excitation vibration has to be able to overcome at least one static friction state of the held steering system by suitable adjustment of its respective excitation amplitude. Since friction coefficients, such as a static friction level or a sliding friction level for example, depend on external state variables, such as a temperature for example, it is necessary to ensure that values for adjusting excitation amplitude and excitation frequency of the excitation vibration are provided in the prescribed table for all sets of external state variables which occur during operation of the steering system, that is to say of the vehicle. Therefore, according to aspects of the invention, the prescribed table contains an assignment of the respective excitation amplitude and the respective excitation frequency to the respective set of external state variables.

Friction coefficients, such as the static friction level or the sliding friction level, can be identified, for example, by way of the steering system being excited by a vibration with a variable excitation amplitude at a defined excitation frequency, wherein the variable excitation amplitude is varied slowly, that is to say without generating nonlinearities in a system response. The phase difference between the vibration and the measured reaction torque is recorded together with the variable excitation amplitude as a function of time, wherein no phase difference occurs in the static friction state and a phase difference of 180° occurs in the sliding friction state. In a first step, beginning with a value of the excitation amplitude at which the elastic connection is still in a static friction state, the excitation amplitude is increased until a transition in the phase difference from 0° to 180° indicates the transition from the static friction state to the sliding friction state. The excitation amplitude which is present for this transition stipulates a static friction coefficient or a static friction level. In a second step, the excitation amplitude is reduced again until a transition in the phase difference from 180° to 0° indicates the transition from the sliding friction state to the static friction state. The excitation amplitude which is present for this transition stipulates a sliding friction coefficient or a sliding friction level.

In order to determine the defined excitation frequency, the steering system is excited by a vibration with a smaller first test amplitude and a larger second test amplitude (test vibration). A test frequency of the vibration is varied from a lower frequency limit to an upper frequency limit, wherein the elastic connection is still in a static friction state for all prescribed external state variables during the vibration at the lower frequency limit and the elastic connection is in a sliding friction state for all prescribed external state variables during the vibration at the upper frequency limit. In a first test step, the vibration has the smaller first test amplitude, which is chosen to be sufficiently large to transfer the elastic connection to the sliding friction state between the lower and upper frequency limits, however. A transition takes place between the static friction state and the sliding friction state in a first transition region around a first natural system frequency. In a second test step, the vibration has the larger second test amplitude. The transition takes place between the static friction state and the sliding friction state in a second transition region around a second natural system frequency. The first test amplitude and the second test amplitude are selected such that the two transition regions do not overlap. Finally, the defined excitation frequency is selected from a frequency range between the two transition regions.

In one embodiment of the method according to aspects of the invention, the prescribed table, which contains the respective excitation amplitude and the respective excitation frequency for the respective set of external state variables by determining the respective transition region between the static friction state and the sliding friction state of the at least one elastic connection of the steering system, is provided by way of the respective excitation frequency being selected from the respective frequency range between a first transition region for a steering system which is held by a driver and a second transition region for the steering system which is not held by the driver. The respective excitation amplitude for a respective static friction level and a respective sliding friction level is ascertained for this respective excitation frequency. A respective table value for the respective excitation amplitude then lies in a value range below the respective static friction level of the non-held system and above the respective sliding friction level of the held steering system. The result of this is that the respective excitation vibration finds the non-held steering system closer to a static friction state, but the held steering system closer to a sliding friction state, and the phase difference shows the abovementioned desired behavior.

In a further embodiment of the method according to aspects of the invention, the respective excitation frequency is selected in the prescribed table for the respective set of external state variables between a natural system frequency for a steering system which is not held by a driver and a natural system frequency for a steering system which is held by the driver.

In a yet further embodiment of the method according to aspects of the invention, the respective set of external state variables are compiled from the following list: temperature, age, wear, service interval. The external state variables influence, for example, a rigidity of the elastic connection and therefore alter a natural system frequency. The method according to aspects of the invention should therefore be carried out for constant external state variables. It is conceivable to vary a setting of the external state variables, and to ascertain the friction coefficients for a respective setting. For example, the external state variable temperature can be varied, for example, in a temperature range which is typical of operation of the overall system.

In an even further embodiment of the method according to aspects of the invention, the steering system is formed from the subsystems steering wheel, steering column and torsion bar.

It is conceivable for the steering system to be excited by the respective excitation vibration on the torsion bar. As a result, expensive installation of an additional sensor system on the steering wheel, for example with direct measurement of contact with contact areas, is advantageously avoided.

The invention further proposes an apparatus for "hands-on" identification on a steering system, which apparatus has a vibration generator, a vibration sensor and at least two subsystems, wherein the at least two subsystems are connected to one another by at least one elastic connection, wherein the at least one elastic connection is described by at least one respective static friction state and one respective sliding friction state for a respective set of external state variables. The apparatus is designed to excite the steering system by an excitation vibration, which is generated by means of the controllable vibration generator and has a respective excitation amplitude and a respective excitation frequency, for a respective set of external state variables. The apparatus is further designed to take the respective excitation amplitude and the respective excitation frequency for the currently present set of external state variables from a prescribed table and to control the vibration generator with them. Finally, the apparatus is designed to measure a reaction torque to the excitation vibration using the vibration sensor, to calculate a phase difference between the excitation vibration and the reaction torque, and to establish a "hands-off" state by a value of the phase difference of between 0° and 90°, and to establish a "hands-on" state by a value of the phase difference of between 90° and 180°.

In one refinement of the apparatus according to aspects of the invention, said apparatus is designed to provide the prescribed table, which contains the respective excitation amplitude and the respective excitation frequency for the respective set of external state variables by determining the respective transition region between the static friction state and the sliding friction state of the at least one elastic connection of the steering system. The respective excitation frequency is selected from the respective frequency range between a first transition region for a steering system which is held by a driver and a second transition region for a steering system which is not held by the driver. The respective excitation amplitude for a respective static friction level of the held steering system and a respective sliding friction level of the non-held steering system is ascertained for this respective excitation frequency, and a respective table value for the respective excitation amplitude between the ascertained respective static friction and sliding friction levels is selected.

In a further refinement of the apparatus according to aspects of the invention, said apparatus is designed to select the respective excitation frequency for the respective set of external state variables between a natural system frequency for a steering system which is not held by a driver and a natural system frequency for a steering system which is held by a driver.

In a yet further refinement of the apparatus according to aspects of the invention, the respective set of external state variables is compiled from the following list: temperature, age, wear, service interval.

In an even further refinement of the apparatus according to aspects of the invention, the steering system is formed from the subsystems steering wheel, steering column and torsion bar.

It is conceivable to arrange the vibration generator and the vibration sensor on the torsion bar.

Further advantages and refinements of the invention can be found in the description and the appended drawings.

It goes without saying that the features cited above and those yet to be explained below can be used not only in the respectively indicated combination but also in other combinations or on their own, without departing from the scope of the present invention.

BRIEF DESCRIPTION OF THE DRAWING FIGURES

The figures are described coherently and comprehensively; identical components have the same associated reference signs.

DETAILED DESCRIPTION OF THE INVENTION

Figure 1:
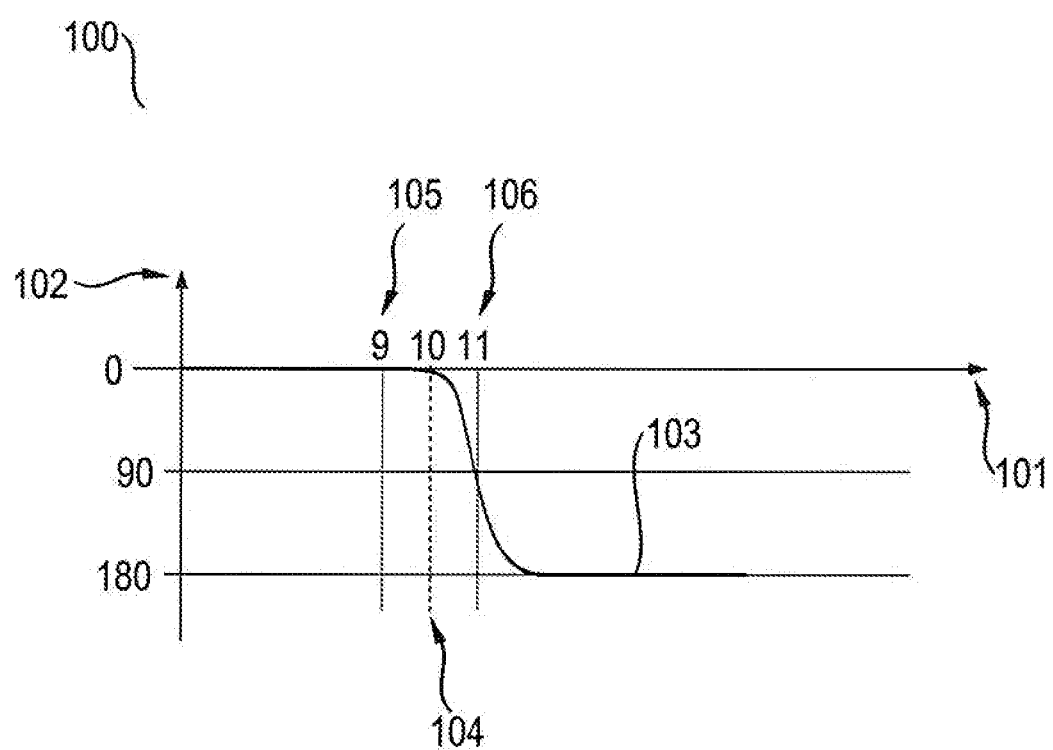
FIG. 1 shows a phase difference characteristic for a "hands-off" state for an embodiment of the method according to aspects of the invention.

FIG. 1 shows a phase difference characteristic 100 for a "hands-off" state, that is to say a non-held steering system, as a function of a phase difference angle, plotted on an ordinate 102 in degrees, with respect to a frequency, plotted along an abscissa 101 in Hz, for an embodiment of the method according to aspects of the invention. In the steering system selected by way of example, a natural system frequency 106 or resonant frequency 106 has a value of approximately 11 Hz for the "hands-off" state. A natural system frequency 105 for a "hands-on" state, that is to say a steering system which is held, has a value of approximately 9 Hz on account of a higher inertia. The excitation frequency 104 lies at 10 Hz, that is to say in a region which is subcritical for the non-held steering system, wherein the non-held steering system is in a or close to a static friction state. Therefore, the phase difference 103 is lower than 90°, only a little above 0° in the case shown, at the excitation frequency 104.

Figure 2:
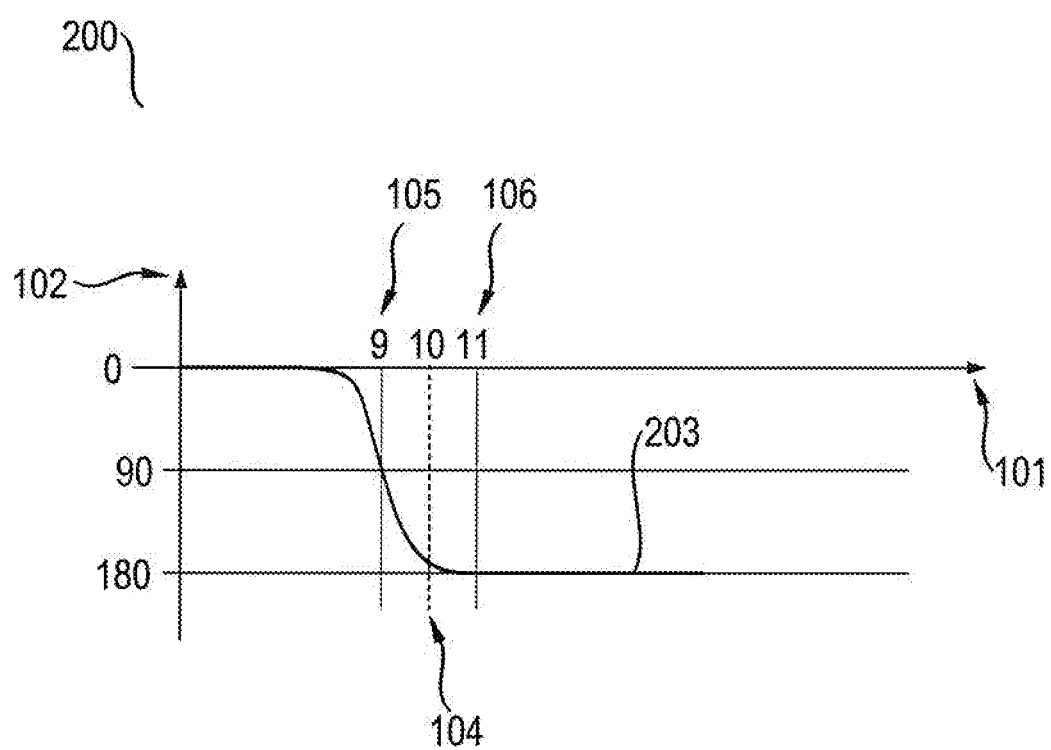
FIG. 2 shows a phase difference characteristic for a "hands-on" state for an embodiment of the method according to aspects of the invention.
Figure 3:
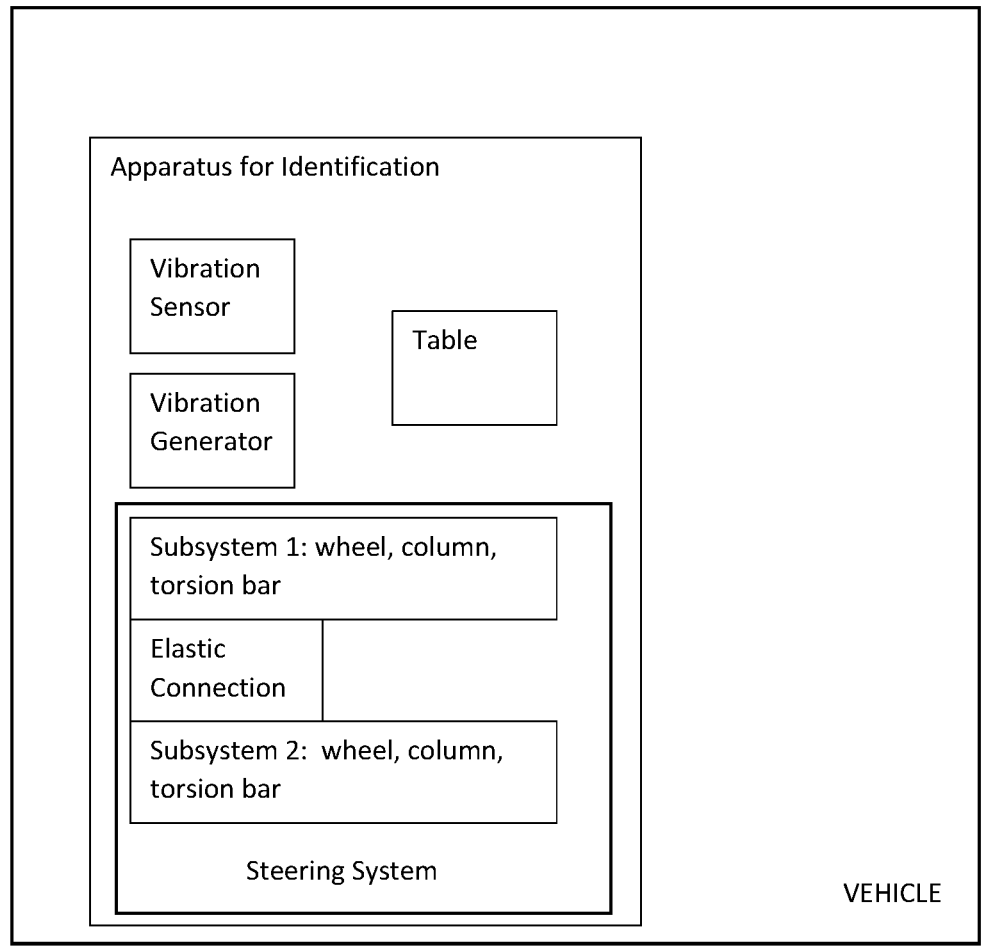
FIG. 3 depicts a block diagram of a vehicle including the apparatus for hands-on identification on a steering system of the vehicle.

FIG. 2 shows a phase difference characteristic 200 for a "hands-on" state, as the held steering system, for an embodiment of the method according to aspects of the invention. Owing to a driver being in contact with the steering system, an overall oscillating mass of the excited steering system has increased and/or a damping of the steering system has increased, as a result of which the natural system frequency 105 assumes a smaller value than the natural system frequency 106 of the non-held steering system. Therefore, the phase difference 203 is greater than 90°, only a little below 180° in the shown case, at the excitation frequency 104.

LIST OF REFERENCE SIGNS

100 Phase difference characteristic of the non-held steering system
101 Frequency in hertz (abscissa)
102 Phase difference angle in degrees (ordinate)
103 Phase difference
104 Excitation frequency
105 Natural system frequency of the held steering system
106 Natural system frequency of the non-held steering system
200 Phase difference characteristic of the held steering system
203 Phase difference

What is claimed:

1. A method for hands-on identification on a steering system having at least two subsystems which are connected to one another by at least one elastic connection, in which the at least one elastic connection has at least one respective static friction state and one respective sliding friction state for a respective set of external state variables, the method comprising:
   exciting the steering system by an excitation vibration, which is generated by a controllable vibration generator and has a respective excitation amplitude and a respective excitation frequency, for a respective set of external state variables,
   taking the respective excitation amplitude and the respective excitation frequency from a table for a currently present set of external state variables;

controlling the vibration generator based on the respective excitation amplitude and the respective excitation frequency, measuring a reaction torque to the excitation vibration using a sensor, calculating a phase difference between the excitation vibration and the reaction torque, and either identifying a hands-off state by a value of the phase difference that is between 0° and 90°, or identifying a hands-on state by a value of the phase difference that is between 90° and 180°.

2. The method as claimed in claim 1, further comprising:

providing the table, which contains the respective excitation amplitude and the respective excitation frequency for the respective set of external state variables by determining the respective transition region between the static friction state and the sliding friction state of the at least one elastic connection of the steering system, by way of the respective excitation frequency being selected from the respective frequency range between a first transition region for a steering system which is held by a driver and a second transition region for the steering system which is not held by the driver, and ascertaining the respective excitation amplitude for a respective static friction level of the held steering system and a respective sliding friction level of the non-held steering system for the respective excitation frequency, and selecting a respective table value for the respective excitation amplitude between the ascertained respective static friction and sliding friction levels.

3. The method as claimed in claim 1, in which the respective excitation frequency is selected in the table for the respective set of external state variables between a natural system frequency for a steering system which is not held by a driver and a natural system frequency for a steering system which is held by the driver.

4. The method as claimed in claim 1, in which the respective set of external state variables is compiled from the following list: temperature, age, wear, and/or service interval.

5. The method as claimed in claim 1, in which the steering system includes a steering wheel, steering column and torsion bar.

6. An apparatus for hands-on identification on a steering system, said apparatus comprising:

a vibration generator, a vibration sensor and at least two subsystems, wherein the at least two subsystems are connected to one another by at least one elastic connection, wherein the at least one elastic connection has at least one respective static friction state and one respective sliding friction state for a respective set of external state variables, wherein the apparatus is configured to (i) excite the steering system by an excitation vibration, which is generated by the controllable vibration generator and has a respective excitation amplitude and a respective excitation frequency, for a respective set of external state variables, (ii) take the respective excitation amplitude and the respective excitation frequency from a table for the currently present set of external state variables and to control the vibration generator with the respective excitation amplitude and the respective excitation frequency, (iii) measure a reaction torque to the excitation vibration using the vibration sensor, (iv) calculate a phase difference between the excitation vibration and the reaction torque, and (v) either establish a hands-off state by a value of the phase difference of between 0° and 90°, or establish a hands-on state by a value of the phase difference of between 90° and 180°.

7. The apparatus as claimed in claim 6, wherein the apparatus is further configured to:

(vi) provide the table which contains the respective excitation amplitude and the respective excitation frequency for the respective set of external state variables by determining the respective transition region between the static friction state and the sliding friction state of the at least one elastic connection of the steering system, (vii) select the respective excitation frequency from the respective frequency range between a first transition region for a steering system which is held by a driver and a second transition region for the steering system which is not held by the driver, and (viii) ascertain the respective excitation amplitude for a respective static friction level of the held steering system and a respective sliding friction level of the non-held steering system for this respective excitation frequency, and (ix) select a respective table value for the respective excitation amplitude between the ascertained respective static friction and sliding friction levels.

8. The apparatus as claimed in claim 6, which is configured to select the respective excitation frequency for the respective set of external state variables between a natural system frequency for a steering system which is not held by a driver and a natural system frequency for a steering system which is held by a driver.

9. The apparatus as claimed in claim 6, in which the respective set of external state variables is compiled from the following list: temperature, age, wear, and/or service interval.

10. The apparatus as claimed in claim 6, in which the steering system comprises a steering wheel, steering column and torsion bar.

* * * * *